UNITED STATES PATENT OFFICE 2,673,863

ESTERS OF 20,21-KETOLS OF THE PREGNANE SERIES WITH ACIDS OF THE TYPE OF TRIMETHYL ACETIC ACID

Karl Miescher, Riehen, Jules Heer, Binningen, and Julius Schmidlin and Peter Wieland, Basel, Switzerland, assignors to Ciba Pharmaceutical Products, Inc., Summit, N. J., No Drawing. Application March 13, 1951,
Serial No. 215,374

Claims priority, application Switzerland
March 24, 1950

5 Claims. (Cl. 260—397.4)

The present invention relates to esters of therapeutically active 20,21-ketols of the pregnane series with acids of the formula

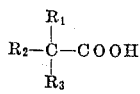

which contain a quaternary carbon atom in the α-position. In the said formula, each of $R_1$, $R_2$ and $R_3$ represents a lower aliphatic hydrocarbon group with at the most three carbon atoms, such for example as methyl, ethyl, propyl, isopropyl.

More especially, the present invention has particular relation to the 21-trimethyl acetic acid esters of the more important therapeutically active 20,21-ketols of the pregnane series, for example, the 21-trimethyl acetate of $\Delta^4$-3,20-diketo-21-hydroxy-pregnene, the 21-trimethyl acetate of $\Delta^5$-20-keto-3,21-dihydroxy-pregnene, $\Delta^4$-3,20-diketo - 17α,21 - dihydroxy - pregnene, $\Delta^4$-3,20-diketo-11,17α,21-trihydroxy-pregnene and $\Delta^4$-3,11,20-triketo-17α,21-dihydroxy-pregnene.

It has been observed that very valuable compounds can be obtained by converting therapeutically active 20,21-ketols of the pregnane series into the said esters. Thus the $\Delta^4$-3,20-diketo-21-trimethylacetoxy-pregnene has a much lower threshold value and is active for a longer time than the $\Delta^4$-3,20-diketo-21-acetoxy-pregnene, a known medicament. Moreover, it is markedly superior to the $\Delta^4$-3,20-diketo-21-benzoyloxy-pregnene, its threshold value being lower. This fact is the more surprising since esters of the specified quaternary acids with therapeutically active hydroxyl compounds of the androstane series not only possess no advantages but are of essentially lower activity than the original hydroxyl compounds and their known esters. For example the trimethyl acetate of testosterone is 50 times less active than testosterone propionate which is the best known ester of testosterone employed as a medicament.

The esters of the present invention may be prepared in a variety of ways. Thus, the specified acids with a quaternary carbon atom in α-position or their reactive derivatives, such as halides, esters or anhydrides, may be reacted with corresponding 20,21-ketols of the pregnane series in the presence or absence of condensing agents. Alternatively it is possible to react the specified acids or their salts with reactive esters of the 20,21-ketols, especially the reactive hydrohalic acid esters. The new esters are also obtained by carrying out the synthesis of the therapeutically active pregnane-20,21-ketols in such a manner that the 21-esters of the above acids are produced directly. Thus it is of especial advantage to produce the new esters starting from 21-diazo ketones of the pregnane series and the corresponding acids. The procedure can also be such that, for example, 21-esters of the saturated 3,20-diketo-21-hydroxy-pregnanes with the specified quaternary acids are produced, and subsequently a double bond introduced in 4,5-position.

The following examples illustrate the invention, the relation between parts by weight and parts by volume being the same as that between the kilogram and the liter. Temperatures are in degrees centigrade.

Example 1

To a solution of 9.5 parts by weight of desoxycorticosterone in 20 parts by volume of pyridine are added, with stirring and ice cooling, 8.5 parts by volume of trimethylacetyl chloride. The reaction solution is allowed to stand for 15 hours at —10° and then treated with ice and water, with continued ice cooling. The precipitated desoxy-corticosterone-trimethyl acetate ($\Delta^4$-3,20-diketo-21-trimethylacetoxy-pregnene) of the formula

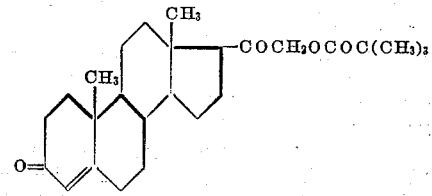

is filtered off and washed with water. After recrystallization from a mixture of benzene and isopropyl ether, it melts at 199–200°, $[\alpha]_D^{23} = +176°$ ($c=1.035$ in chloroform).

Example 2

3 parts by weight of $\Delta^5$-21-diazo-pregnene-3β-ol-20-one are treated with 12 parts by weight of trimethyl-acetic acid and heated in an oil bath up to incipient nitrogen evolution. The splitting off of nitrogen sets in at about 135° and becomes very violent at 150°. When the evolution of nitrogen is complete and after cooling, the product is treated with ether and washed with dilute sodium carbonate solution and water. The residue from the dried and evaporated ether solution is chromatographed on 80 parts by weight of aluminum oxide. From the benzene eluates there is obtained after recrystallization from a mixture of acetone and isopropyl ether, the Δ⁵-20-keto - 3β-hydroxy - 21-trimethyl-acetoxy-pregnene of the formula

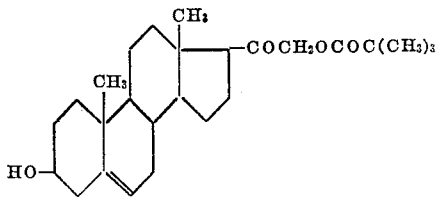

as colorless leaflets which melt at 177-178°, $[\alpha]_D^{23}=+32°$ ($c=0.945$ in chloroform).

By oxidation according to Oppenauer with cyclohexanone and aluminum isopropylate, there is obtained therefrom the desoxycorticosterone-trimethyl acetate, melting at 199-200°, described in Example 1.

Example 3

1 part by weight of Δ⁴-3,11,20-triketo-17α,21-dihydroxypregnene is dissolved in 10 parts by volume of pyridine and treated drop by drop, with efficient cooling, with 5 parts by weight of trimethylacetyl chloride. After standing for a time in the cold, the reaction mixture is poured carefully into water. The precipitated Δ⁴-3,11,20-triketo-17α-hydroxy - 21-trimethyl-acetoxy-pregnene of the formula

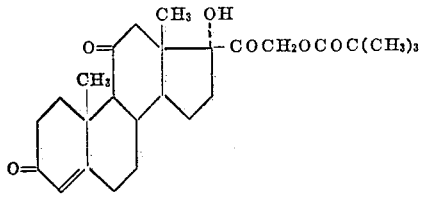

is obtained, after recrystallization from acetone, in the form of fine needles of melting point 260-262° $[\alpha]_D^{23}=+210°$ ($c=0.910$ in chloroform).

Example 4

0.875 part by weight of Δ⁴-3,20-diketo-17α,21-dihydroxy-pregnene is dissolved in 6 parts by volume of anhydrous pyridine and the solution cooled to —10° and treated drop by drop with 2 parts by volume of trimethylacetyl chloride. The reaction mixture is allowed to stand, with the exclusion of moisture, for 16 hours at —10° and thereupon the excess of acid chloride destroyed by careful addition of 2 parts by volume of water. After 2 hours the whole is poured into 50 parts by volume of ice-cold 2N-hydrochloric acid and the reaction product taken up in methylene chloride. The methylene chloride extracts are washed consecutively with 2N-hydrochloric acid, water, 2 per cent. aqueous sodium bicarbonate solution and water. The methylene chloride solutions are combined, dried with sodium sulphate, filtered and evaporated. From the residue there is obtained, by recrystallization from acetone, the Δ⁴-3,20 - diketo - 17α-hydroxy - 21-trimethyl-acetoxy-pregnene of the formula

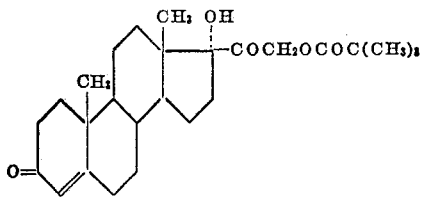

in the form of colorless prisms which melt at 262-265° (with slight discoloration above 256°) and having a specific rotation $[\alpha]_D^{21}=+141°\pm4°$ ($c=1.090$ in chloroform).

On dissolving a small test portion of the substance in concentrated sulphuric acid, there is observed after a short time an intensive carmine red color reaction.

Example 5

A solution of 1.735 parts by weight of Δ⁴-3,20-diketo-17α,21-dihyroxy-pregnene in 50 parts by volume of anhydrous methylene chloride, prepared in an atmosphere of dry nitrogen, is mixed at —15° in the course of 2 hours with a mixture of 3 parts by volume of trimethylacetyl chloride, 2 parts by volume of absolute pyridine and 20 parts by volume of anhydrous methylene chloride. When the addition is complete, the whole is stirred for 2 hours at —10°, then for another 60 hours at 0°. The reaction mass is then cooled to —10° and after the destruction of the excess acid chloride with 2 parts by volume of methanol and 1 part by volume of pyridine the whole is stirred for another 4 hours with ice cooling. The reaction mass is then poured onto ice, and the reaction product taken up in methylene chloride. The methylene chloride solution is washed consecutively with 0.5N-hydrochloric acid, water, 2 per cent. sodium bicarbonate solution, and water, dried with sodium sulphate and evaporated. The residue is freed from trimethyl acetic acid methyl ester under reduced pressure and then recrystallized from acetone with chloroform as solution promoter. The resultant Δ⁴-3,20-diketo - 17α-hydroxy - 21-trimethyl-acetoxy-pregnene is obtained in the form of colorless prisms melting at 265-267° (with discoloration) and having a specific rotation $$[\alpha]_D^{20}=+141°\pm4°$$

($c=0.950$ in chloroform).

Example 6

0.995 part by weight of Δ⁴-3,20-diketo-21-bromo-pregnene is dissolved in 50 parts by volume of dry acetone. After the addition of 1 part by weight of finely powdered sodium trimethyl acetate, the mixture is refluxed for 10 hours. Water, ether, and chloroform are then admixed. The organic solution is washed with water, dried and evaporated, and the residue recrystallized from a mixture of chloroform and isopropyl ether. The resultant trimethyl acetate of desoxycorticosterone melts at 201.5-202.5°.

Example 7

4 parts by volume of tripropylacetyl chloride are added at —10° to a solution of 2 parts by weight of desoxycorticosterone in 5 parts by volume of pyridine and the reaction solution is allowed to stand at —10° for 6 days. It is then admixed with ice water, agitated with ether, and the ethereal solution washed in turn with dilute hydrochloric acid, water, dilute sodium carbonate solution, and water, then dried and evaporated. By recrystallizing the residue from isopropyl ether there is obtained the tripropyl acetate of desoxycorticosterone of the formula

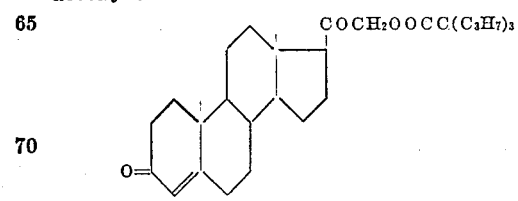

in the form of matted needles of melting point 123-123.5°, $[\alpha]_D^{20}=+150°$ ($c=1.068$ in chloroform).

Example 8

1 part by weight of desoxycorticosterone is dissolved in 2 parts by volume of dry pyridine and admixed with 1 part by volume of α,α-dimethylbutyric acid chloride while cooling with a mixture of ice and sodium chloride. The reaction mixture is then allowed to stand over night at —10° and the next day ice is added while effectively cooling and the precipitated α,α-dimethylbutyrate of desoxycorticosterone of the formula

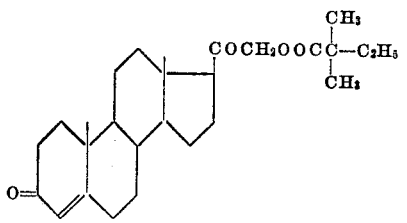

is separated by filtering. From acetone it crystallizes in colorless needles of melting point 160–160.5°, $[\alpha]_D^{23} = +162°$ ($c=0.99$ in chloroform).

Having thus disclosed the invention, what is claimed is:

1. A $\Delta^4$-3,20-diketo-21-trialkylacetoxy - pregnene wherein the alkyl group contains at the most three carbon atoms.

2. $\Delta^4$-3,20-diketo-21 - trimethylacetoxy - pregnene.

3. $\Delta^4$-3,20-diketo - 21 - trimethylacetoxy-17α-hydroxy-pregnene.

4. $\Delta^4$-3,20-diketo-21 - trimethylacetoxy-11,17α-dihydroxy-pregnene.

5. $\Delta^4$-3,11,20-triketo-21 - trimethylacetoxy-17α-hydroxy-pregnene.

KARL MIESCHER.
JULES HEER.
JULIUS SCHMIDLIN.
PETER WIELAND.

References Cited in the file of this patent
UNITED STATES PATENTS

| Number | Name | Date |
|---|---|---|
| 2,109,400 | Miescher | Feb. 22, 1938 |
| 2,183,589 | Reichstein | Dec. 19, 1939 |
| 2,265,183 | Miescher | Dec. 9, 1941 |
| 2,316,142 | Cartland | Apr. 6, 1943 |